United States Patent
Moon

(10) Patent No.: US 7,406,308 B2
(45) Date of Patent: Jul. 29, 2008

(54) WIRELESS COMMUNICATION TERMINAL FOR IDENTIFYING AND INDICATING SHORT MESSAGE TYPES USING INDICATOR ICONS AND METHOD THEREOF

(75) Inventor: Byoung-Seoup Moon, Suwon-shi (KR)

(73) Assignee: Samsung Electronics Co., Ltd (KR)

( * ) Notice: Subject to any disclaimer, the term of this patent is extended or adjusted under 35 U.S.C. 154(b) by 773 days.

(21) Appl. No.: 10/341,934

(22) Filed: Jan. 14, 2003

(65) Prior Publication Data
US 2004/0075691 A1    Apr. 22, 2004

(30) Foreign Application Priority Data
Oct. 22, 2002    (KR)    ............ 10-2002-0064622

(51) Int. Cl.
H04Q 7/22    (2006.01)
H04M 1/663    (2006.01)
(52) U.S. Cl. .............. 455/412.2; 455/566; 455/414.1
(58) Field of Classification Search ............ 455/412.14, 455/412.2, 413, 414.1, 466, 550.1, 566, 412.1
See application file for complete search history.

(56) References Cited

U.S. PATENT DOCUMENTS

| | | | |
|---|---|---|---|
| 6,313,736 B1 * | 11/2001 | Hymel et al. | 340/7.56 |
| 6,456,841 B1 * | 9/2002 | Tomimori | 455/412.2 |
| 6,810,262 B2 * | 10/2004 | Kim | 455/466 |
| 6,959,207 B2 * | 10/2005 | Keinonen et al. | 455/567 |
| 2004/0198435 A1 * | 10/2004 | Gauld et al. | 455/556.1 |
| 2005/0261020 A1 * | 11/2005 | Kumar | 455/550.1 |

\* cited by examiner

*Primary Examiner*—Blane J Jackson
(74) *Attorney, Agent, or Firm*—The Farrell Law Firm, PC

(57) ABSTRACT

A wireless communication terminal for identifying types of received short messages using indicator icons, and a method for displaying indicator icons using the same. The wireless communication terminal comprises a storage unit for storing indicator icons corresponding respectively to types of serviceable short messages such that they are identifiable according to the types of the serviceable short messages, a display unit for displaying the indicator icons corresponding respectively to the types of the short messages on a screen, a communication unit for communicating with an external communications device and receiving a short message transmitted from the external device, a determiner for determining a type of the short message received by the communication unit on the basis of the indicator icons stored in the storage unit, and a controller for extracting one of the indicator icons corresponding to the determined short message type from the storage unit and controlling the display unit to display the extracted indicator icon on the screen.

14 Claims, 5 Drawing Sheets

T : TEXT MESSAGE
V : VOICE MESSAGE
I : IMAGE MESSAGE

T : TEXT MESSAGE
V : VOICE MESSAGE
I : IMAGE MESSAGE

WIRELESS COMMUNICATION TERMINAL FOR IDENTIFYING AND INDICATING SHORT MESSAGE TYPES USING INDICATOR ICONS AND METHOD THEREOF

PRIORITY

This application claims priority to an application entitled "WIRELESS COMMUNICATION TERMINAL FOR PROVIDING SERVICE FOR IDENTIFICATION OF TYPES OF RECEIVED SHORT MESSAGES USING INDICATOR ICONS AND METHOD FOR DISPLAYING INDICATOR ICONS USING THE SAME", filed in the Korean Industrial Property Office on Oct. 22, 2002 and assigned Serial No. 2002-64622, the contents of which are hereby incorporated by reference.

BACKGROUND OF THE INVENTION

1. Field of the Invention

The present invention relates to a wireless communication terminal that is capable of providing a short message service and a method for displaying indicator icons using the same, and more particularly to a wireless communication terminal that is capable of setting indicator icons according to the types of serviceable short messages and displaying one of the set indicator icons corresponding to the type of a received short message to enable a user to more readily identify the received short.

2. Description of the Related Art

With the rapid advance of the communication industry and the rapid growth of mobile communication services, mobile communication terminals (referred to hereinafter as wireless communication terminals) have practically become a necessity of life. In order to meet users' various requests for improved functions, such wireless communication terminals have a variety of functions, in addition to a basic mobile wireless telephony function. Such additional functions may be, for example, a short message service (SMS), an MP3 function, wireless Internet, a camera, a TV, VOD (Video on Demand), etc.

Consequently, the number of users sending and receiving short messages using wireless communication terminals has recently increased rapidly. The short message service has gained considerable popularity among users because its usage fee is much lower than that for a voice call service. Here, the short message service includes a text message service and a voice message service. The text message service is a service used when a sender edits a text and/or image using a wireless communication terminal and/or computer and sends the edited result to a wireless communication terminal of a recipient. The voice message service is a service, which is provided by a base station to transmit a message, sent to a voice mailbox by a sender, to a wireless communication terminal of a recipient.

In general terms, a conventional wireless communication terminal, upon receiving a short message, displays an indicator icon on an icon display area of a screen so that a user can confirm the reception of the short message. However, the conventional wireless communication terminal displays the same indicator icon on the screen irrespective of the type of the received short message. At this time, the displayed indicator icon generally has an "envelope" figure. As a result, it is impossible for the user to identify the type of the received short message only by seeing the indicator icon displayed on the screen.

On the other hand, provided that the conventional wireless communication terminal has an external screen, upon receiving one text message, it can display a part of the contents of the received message on the external screen. However, if a new short message is received under this condition, then the wireless communication terminal displays some of the contents of the received new message on the screen instead of the contents of the message being currently displayed on the screen. For this reason, the user has the inconvenience of having to identify the type of a short message received and stored in a short message inbox by conducting a key operation using menu keys provided in the wireless communication terminal, in order to determine whether the received short message is a text message or voice message.

The conventional wireless communication terminal has a further disadvantage in that it is impossible for the user to recognize the number of short messages received, but not confirmed by himself/herself, and/or short messages newly received in his/her absence through the indicator icon displayed on the screen. For this reason, the user must check the short message inbox using the menu keys in the wireless communication terminal to recognize the number of non-confirmed short messages, or short messages newly received in his/her absence.

SUMMARY OF THE INVENTION

Therefore, the present invention has been designed in view of the above problems, and it is an object of the present invention to provide a wireless communication terminal and method for providing a service that enables a user to readily identify the types of received short messages.

It is another object of the present invention to provide a wireless communication terminal and method for providing a service that enables a user to more readily identify the types of received short messages using indicator icons, which are displayed to indicate the reception of the short messages.

It is a further object of the present invention to provide a wireless communication terminal and method for providing a service that enables a user to readily recognize the number of non-confirmed short messages by himself/herself, and/or short messages newly received in his/her absence.

It is yet another object of the present invention to provide a wireless communication terminal and method wherein a user can simply and conveniently confirm non-confirmed short messages by himself/herself, and/or short messages newly received in his/her absence.

In accordance with one aspect of the present invention, the above and other objects are accomplished by a wireless communication terminal for providing indications as to whether serviceable short messages have been received, through indicator icons. The terminal comprises a storage means for storing the indicator icons, the icons corresponding respectively to types of the serviceable short messages such that they are identifiable according to the types of the serviceable short messages; a display means for displaying the indicator icons corresponding respectively to the types of the short messages on a screen; a communication means for communicating with an external communications device and receiving a short message transmitted from the external device; a determination means for determining a type of the short message received by the communication means on the basis of the indicator icons stored in the storage means; and a control means for extracting one of the indicator icons corresponding to the determined short message type from the storage means and controlling the display means to display the extracted indicator icon on the screen.

Preferably, the wireless communication terminal further comprises counting means for counting the number of short messages whose list information is not selected, among received short messages, and short messages newly received in a user's absence. In this case, the control means appends information regarding the counted number to the extracted indicator icon, and controls the display means to display the resulting indicator icon on a desired area of the screen. The control means also stores the short message received by the communication means in the storage means and links the extracted indicator icon displayed on the screen to an address of the storage means at which the short message received by the communication means is stored.

Preferably, the wireless communication terminal further comprises a key input means including a message confirm key for providing a short message service. In this case, if the message confirm key is selected, the control means extracts information regarding a list of short messages linked to the extracted indicator icon displayed on the screen from the storage means and controls the display means to display the extracted list information on the screen. Further, if the message confirm key is selected and the short messages linked to the extracted indicator icon displayed on the screen are of a plurality of types, the control means controls the display means to display message inbox menus that are selectable according to the types of the linked short messages on the screen.

If any one of the message inbox menus is selected, the control means controls the display means to display short message list information corresponding to the selected inbox menu on the screen. In the present embodiment, the types of the short messages each include at least one of a text message type, a voice message type, and an image message type.

In accordance with another aspect of the present invention, there is provided a method for displaying indicator icons using a wireless communication terminal, comprising the steps of: a) storing the indicator icons, which correspond respectively to types of serviceable short messages such that they are identifiable according to the types of the serviceable short messages; b) receiving a short message transmitted from an external device; c) determining a type of the received short message on the basis of the stored indicator icons; and d) displaying a specific one of the stored indicator icons corresponding to the determined short message type on a screen.

Preferably, the method may further comprise the step of e) counting the number of short messages whose list information is not selected, among received short messages, and short messages newly received in a user's absence. In this case, step d) includes the step of appending information regarding the counted number to the specific indicator icon and displaying the resulting indicator icon on a desired area of the screen. In addition, the specific indicator icon displayed on the screen in step d) includes information regarding a link to an address at which the short message received in step b) is stored.

Preferably, the method may further comprise the step of displaying on the screen information regarding a list of short messages linked to the specific indicator icon displayed on the screen if a menu for confirmation of the stored short message is selected.

Preferably, the method may further comprise the steps of if the menu for confirmation of the stored short message is selected and the short messages linked to the specific indicator icon displayed on the screen are of a plurality of types, displaying message inbox menus that are selectable according to the types of the linked short messages on the screen; and if any one of the message inbox menus displayed on the screen is selected, displaying short message list information corresponding to the selected inbox menu on the screen.

In a feature of the present invention, indicator icons corresponding respectively to the types of serviceable short messages are set and stored in a storage unit. The type of a received short message is determined, and the corresponding indicator icon is extracted from the storage unit and then displayed on a desired area of a screen. Therefore, a user can more readily identify the type of the received short message. Further, an indicator icon is displayed on the screen along with short message type information and information about the number of non-confirmed short messages, and/or short messages newly received in the user's absence. Therefore, the user can more readily identify the type of a received short message, and also recognize the number of non-confirmed short messages and/or short messages newly received in his/her absence. Furthermore, if a message confirm key is selected for the confirmation of the contents of a received short message, then information regarding a list of short messages at addresses of the storage unit linked to an indicator icon displayed on the screen is displayed on the screen. Therefore, the user can confirm the contents of the received short message in a simpler manner.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the annexed drawings. In the following description, a detailed description of known functions and configurations incorporated herein will be omitted when it may make the subject matter of the present invention rather unclear.

Figure 1:
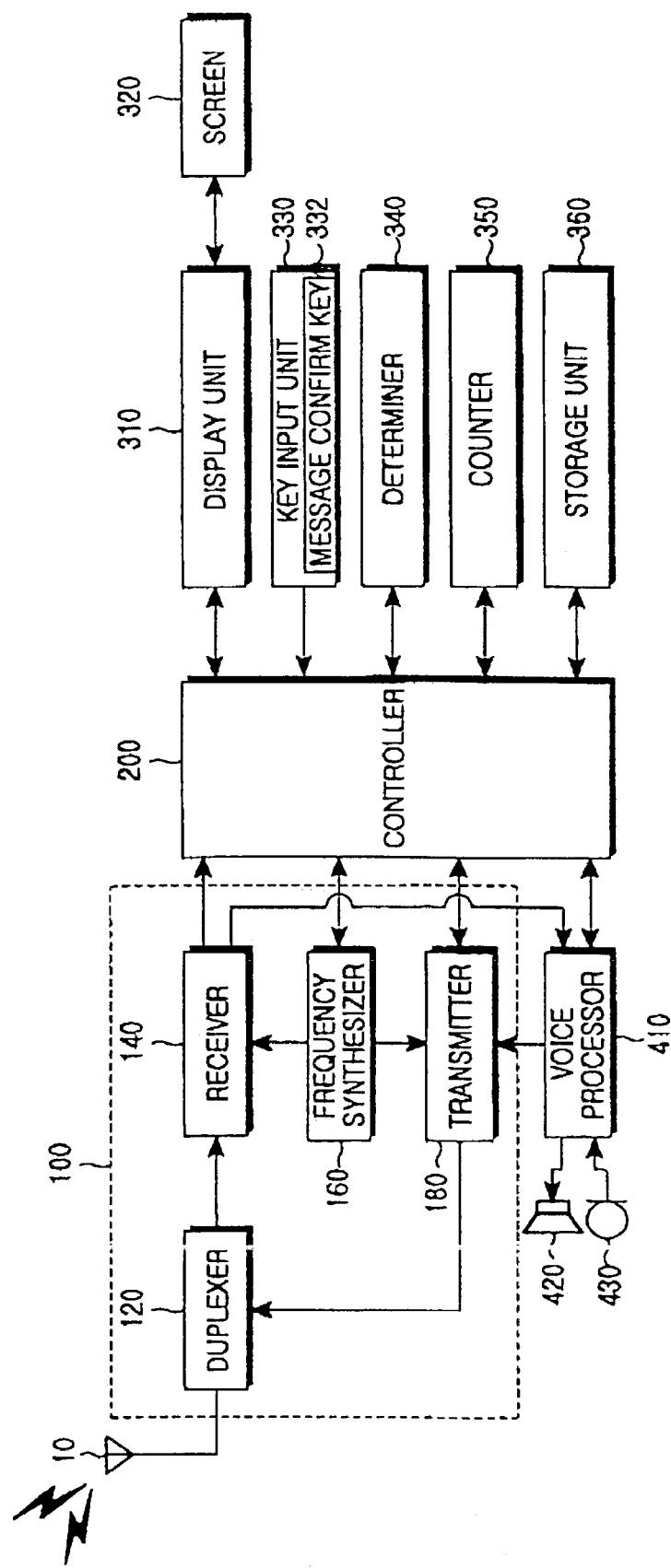
FIG. 1 is a block diagram illustrating a preferred embodiment of a wireless communication terminal in accordance with the present invention.

FIG. 1 is a block diagram of a preferred embodiment of a wireless communication terminal in accordance with the present invention. However, before describing the preferred embodiment of the present invention, a brief description will hereinafter be given of a conventional construction of the wireless communication terminal with reference to FIG. 1.

In FIG. 1, the wireless communication terminal comprises a communication unit 100, a voice processor 410, a controller 200, a display unit 310, a key input unit 330, and a storage unit 360.

The communication unit 100 communicates with an external communications device and receives a short message and other data transmitted from the external device. The voice processor 410 decodes an output signal from a receiver 140 in the communication unit 100, converts the decoded result into an electrical voice signal, and outputs the converted voice signal to a speaker 420. The voice processor 410 also converts a voice signal received through a microphone 430 into an electrical signal, codes the converted signal, and outputs the coded result to a transmitter 180.

The controller 200 controls the entire operation of the wireless communication terminal, including transmission and reception of signals for communication with the external device. The display unit 310 displays status information and/or operation information of the wireless communication terminal on a screen 320 under the control of the controller 200. The key input unit 330 includes a plurality of numeral keys and character keys, and generates data corresponding to a selected one of the keys and transfers the generated data to the controller 200. The storage unit 360 temporarily stores a drive program that is necessary for the control of the controller 200 and data generated during the control thereof.

In a preferred embodiment of the present invention the key input unit 330 includes menu keys for short message transmission and reception, including a message confirm key 332 for providing a service for confirmation of the contents of a received short message in response to a selection signal. Stored in the storage unit 360 according to the present embodiment are indicator icons, which are identifiable according to the types of serviceable short messages. Received short messages are also stored in the storage unit 360.

As illustrated in FIG. 1, the communication unit 100 includes a duplexer 120, the receiver 140, a frequency synthesizer 160, and the transmitter 180. The duplexer 120 extracts a signal of a predetermined frequency band from among signals received at an antenna 10 and outputs the extracted signal to the receiver 140. The duplexer 120 also transfers an output signal from the transmitter 180 to the antenna 10. The receiver 140, which is operated under the control of the controller 200, transfers output data from the duplexer 120 to the voice processor 410 if it corresponds to a voice signal, and transfers output data to the controller 200 if it does not correspond to a voice signal.

The frequency synthesizer 160 generates and outputs frequencies to the transmitter 180 and receiver 140, respectively, under the control of the controller 200. The transmitter 180 converts an output signal from the voice processor 410 into a signal of a predetermined frequency band for transmission in response to an output signal from the frequency synthesizer 160.

Alternatively, the wireless communication terminal according to the embodiment of the present invention further comprises a determiner 340 and a counter 350. The determiner 340 determines the type of a short message received by the receiver 140 in the communication unit 100 on the basis of the indicator icons stored in the storage unit 360 and provide the determined result to the controller 200. As a result, the controller 200 extracts one of the indicator icons corresponding to the determined short message type from the storage unit 360. The controller 200 then controls the display unit 310 to display the extracted indicator icon on a desired area of the screen 320. Preferably, the controller 200 appends the indicator icon displayed on the screen 320 information regarding a link to an address of the storage unit 360 at which the corresponding short message is stored.

The counter 350 counts the number of short messages whose list information is not selected, among received short messages, and short messages newly received in a user's absence. The controller 200 appends information regarding the counted number to the extracted indicator icon, and controls the display unit 310 to display the resulting indicator icon on the desired area of the screen 320.

Therefore, in the present invention, indicator icons corresponding respectively to the types of serviceable short messages are set and stored in the storage unit 360. The type of a received short message is determined, and the corresponding indicator icon is extracted from the storage unit 360 and then displayed on the desired area of the screen 320. As a result, the user can more readily identify the type of the received short message. Further, the extracted indicator icon is displayed on the screen 320 together with information regarding the number of short messages received, but not confirmed by the user, and short messages newly received in his/her absence. As a result, the user can more readily recognize the number of non-confirmed short messages, and short messages received in his/her absence.

In the preferred embodiment of the present invention, if the message confirm key 332 provided in the key input unit 330 is selected, then the controller 200 extracts information regarding a list of short messages linked to an indicator icon displayed on the screen 320 from the storage unit 360, and controls the display unit 310 to display the extracted list information on the screen 320. On the other hand, when the short messages linked to the displayed indicator icon are of a plurality of types, the controller 200 controls the display unit 310 to display message inbox menus that are selectable according to the types of the short messages on the screen 320. At this time, if any one of the message inbox menus displayed on the screen 320 is selected, then the controller 200 extracts short message list information corresponding to the selected inbox menu from the storage unit 360, and controls the display unit 310 to display the extracted list information on the screen 320.

The types of short messages applied in the present embodiment may be, for example, a text message type, a voice message type, or an image message type.

Figure 2:
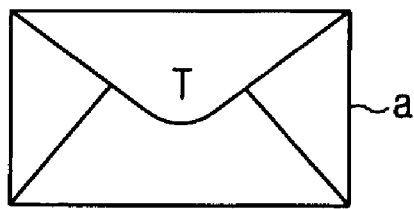
FIG. 2 is a view illustrating examples of indicator icons displayable according to the types of short messages received by the terminal illustrated in FIG. 1.
Figure 2:
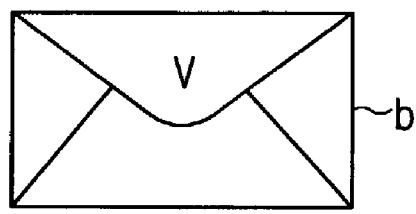
Figure 2:
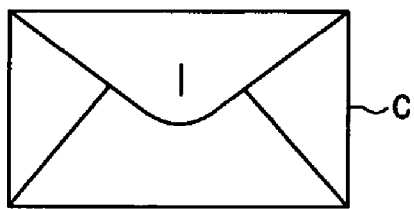
Figure 2:
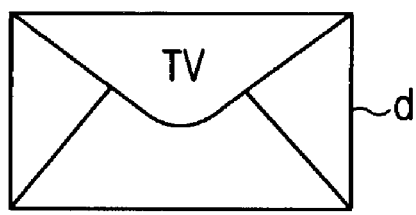
Figure 2:
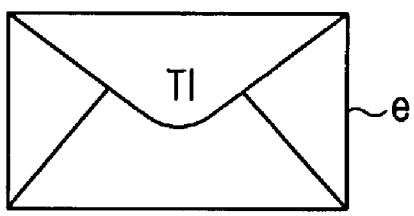
Figure 2:
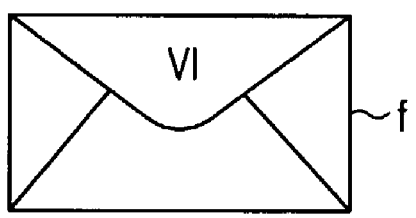
Figure 2:
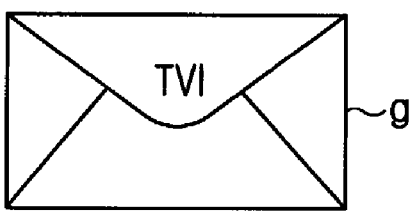

FIG. 2 illustrates examples of indicator icons displayable according to the types of short messages received by the wireless communication terminal illustrated in FIG. 1. In this drawing, a text message T, a voice message V, and an image message I are shown as examples of the types of short messages.

Icon a in FIG. 2 denotes an indicator icon displayed on the screen 320 when the type of a received short message is a text message T, and icon b denotes an indicator icon displayed on the screen 320 when the type of a received short message is a voice message V. Icon c in FIG. 2 denotes an indicator icon displayed on the screen 320 when the type of a received short message is an image message I, and icon d denotes an indicator icon displayed on the screen 320 when the type of a received short message is a combination of a text message T and voice message V. Icon e in FIG. 2 denotes an indicator icon displayed on the screen 320 when the type of a received short message is a combination of a text message T and image message I, and icon f denotes an indicator icon displayed on the screen 320 when the type of a received short message is a combination of a voice message V and image message I. Icon g in FIG. 2 denotes an indicator icon displayed on the screen 320 when the type of a received short message is a combination of a text message T, voice message V, and image message I.

Thus, indicator icons including different characters depending on the types of short messages are displayed on the screen 320, so that the user can more readily identify the type of a received short message.

Although the description above has been given of an indicator icon displayed on the screen 320 according to the type of a received short message, the displayed indicator icon may also include information regarding the types of non-confirmed short messages among the previously received short messages.

Figure 3:
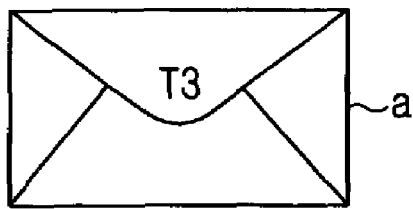
FIG. 3 is a view illustrating examples of indicator icons including information about the number of short messages received by the terminal illustrated in FIG. 1.
Figure 3:
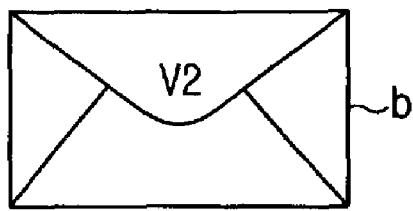
Figure 3:
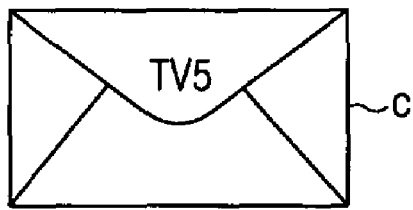
Figure 3:
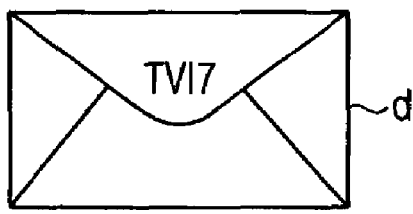

FIG. 3 illustrates examples of indicator icons including information about the number of short messages received by the wireless communication terminal illustrated in FIG. 1. Icon a in FIG. 3 denotes an indicator icon indicative of the reception of three text messages T, and icon b denotes an indicator icon indicative of the reception of two voice messages V. Icon c in FIG. 3 denotes an indicator icon indicative of the reception of five short messages including text messages T and voice messages V, and icon d denotes an indicator icon indicative of the reception of seven short messages including text messages T, voice messages V, and image messages I.

Therefore, an indicator icon is displayed on the screen 320 along with short message type information and information about the number of non-confirmed short messages, and/or short messages newly received in the user's absence, so that the user can more readily identify the type of a received short message, and also recognize the number of non-confirmed short messages and/or short messages newly received in his/her absence.

Figure 4:
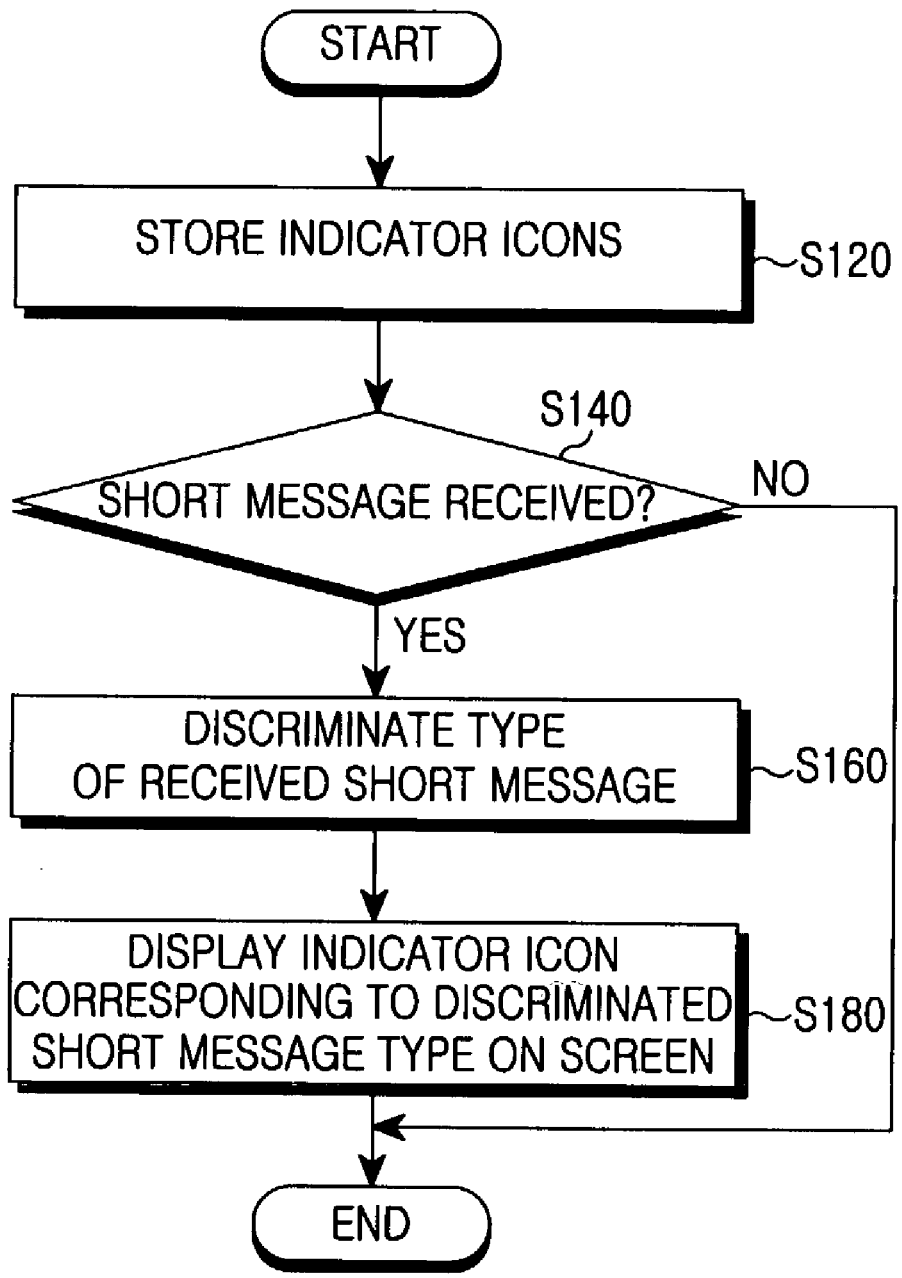
FIG. 4 is a flow chart illustrating a preferred method for displaying indicator icons using the wireless communication terminal in accordance with the present invention.

FIG. 4 is a flow chart illustrating a preferred a method for displaying indicator icons using the wireless communication terminal in accordance with the present invention. First, the controller 200 stores in the storage unit 360 indicator icons set to correspond respectively to the types of serviceable short messages in step S120. Thereafter, the controller 200 determines whether a short message has been received through the antenna 10 in step S 140. Upon determining that a short message has been received, the controller 200 controls the determiner 340 to determine the type of the received short message in step S160. As a result, the determiner 340 determines the type of the received short message on the basis of the indicator icons stored in the storage unit 360. The controller 200 extracts one of the indicator icons corresponding to the determined short message type from the storage unit 360, and then controls the display unit 310 to display the extracted indicator icon on the screen 320 in step S180. Finally, the display unit 310 displays the extracted indicator icon on the screen 320 in response to a control command from the controller 200.

Consequently, an indicator icon readily identifiable according to the type of a received short message is displayed on the screen 320, so that the user can more readily identify the type of the received short message.

Figure 5:
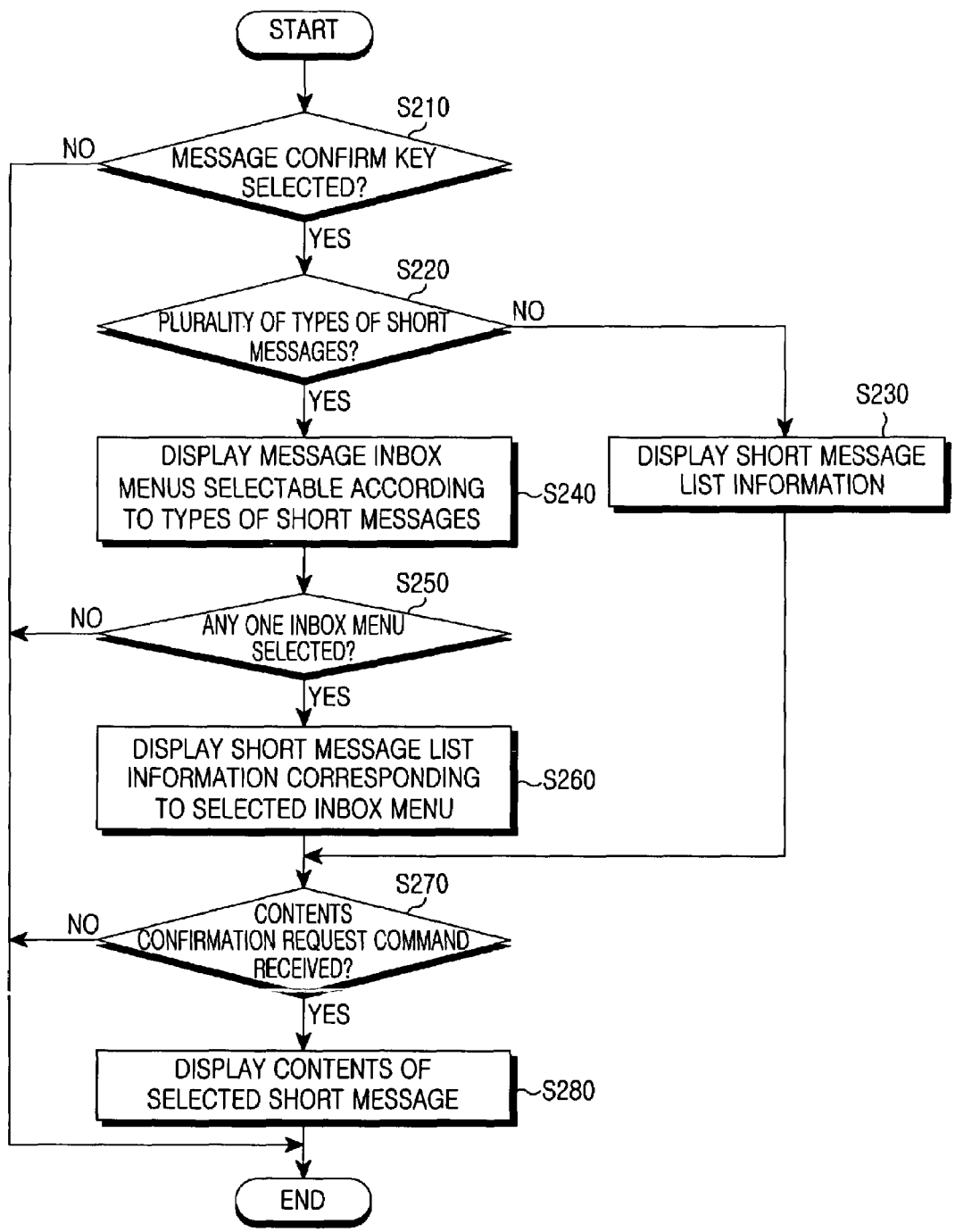
FIG. 5 is a flow chart illustrating a method for displaying the contents of a received short message on the basis of the input of a selection signal for confirmation of the received short message.

FIG. 5 is a flow chart illustrating a method for displaying the contents of a received short message on the basis of the input of a selection signal for confirmation of the received short message. First, the controller 200 determines whether a signal for selection of the message confirm key 332 provided in the key input unit 330 has been input in step S210. If the message confirm key 332 selection signal is determined to have been input, then the controller 200 determines whether non-confirmed short messages, and/or short messages newly received in the user's absence are of a plurality of types in step S220. If the short messages are of one type, the controller 200 extracts list information of the short messages from the storage unit 360, and controls the display unit 310 to display the extracted list information on the screen 320 in step S230.

If the short messages are determined to be of a plurality of types in step S220, then the controller 200 controls the display unit 310 to display message inbox menus selectable according to the types of the short messages on the screen 320 in step S240. The display unit 310 displays message inbox menus provided from the controller 200 on the screen 320. Thereafter, the controller 200 determines whether any one of the message inbox menus displayed on the screen 320 has been selected through the key input unit 330 in step S250.

If any one of the message inbox menus displayed on the screen 320 has been selected, the controller 200 extracts short message list information corresponding to the selected inbox menu from the storage unit 360, and controls the display unit 310 to display the extracted list information on the screen 320 in step S260. As a result, the display unit 310 displays the extracted list information on the screen 320.

Thereafter, the controller 200 determines whether a command for requesting the confirmation of the contents of a selected short message in the list information displayed on the screen 320 has been received through the key input unit 330 in step S270. If the contents confirmation request command has been received, the controller 200 extracts the contents of the selected short message from the storage unit 360, and controls the display unit 310 to display the extracted message contents on the screen 320 in step S280.

Accordingly, if the message confirm key 332 is selected for the confirmation of the contents of a received short message, then information regarding a list of short messages at addresses of the storage unit 360 linked to an indicator icon displayed on the screen 320 is displayed on the screen 320, thereby enabling the user to confirm the contents of the received short message in a simpler manner.

As is apparent from the above description, according to the present invention, indicator icons corresponding respectively to the types of serviceable short messages are set and stored in a storage unit. The type of a received short message is determined, and the corresponding indicator icon is extracted from the storage unit and then displayed on a desired area of a screen. Accordingly, a user can more readily identify the type of the received short message.

Further, an indicator icon is displayed on the screen along with short message type information and information about the number of non-confirmed short messages, and/or short messages newly received in the user's absence. Therefore, the user can more readily identify the type of a received short message, and also recognize the number of non-confirmed short messages and/or short messages newly received in his/her absence.

Furthermore, if a message confirm key is selected for the confirmation of the contents of a received short message, then information regarding a list of short messages at addresses of the storage unit linked to an indicator icon displayed on the screen is displayed on the screen. Therefore, the user can confirm the contents of the received short message in a simpler manner.

While the preferred embodiments of the present invention have been disclosed for illustrative purposes, those skilled in the art will appreciate that various modifications, additions, and substitutions are possible, without departing from the scope and spirit of the invention as disclosed in the accompanying claims.

What is claimed is:

1. A wireless communication terminal for indicating when dissimilar serviceable short messages have been received, utilizing an indicator icon that includes at least one or more types of the received short message, the wireless communication terminal comprising:
- a storage means for storing said indicator icon, said icon corresponding respectively to types of said serviceable short messages such that they are identifiable according to the types of said serviceable short messages;
- a communication means for communicating with an external communications device and receiving a short message transmitted from said external device;
- a determination means for determining a type of said short message received by said communication means on the basis of said indicator icon stored in said storage means;
- a control means for extracting one of said indicator icon corresponding to the determined short message type from said storage means and controlling said display means to display the extracted indicator icon on a screen; and
- a display means for displaying on said screen said indicator icon corresponding respectively to the types of said short messages
- wherein the indicator icon includes a character to identify the type of each received short message.

2. The wireless communication terminal as set forth in claim 1, further comprising a counting means for counting a number of short messages whose list information is not selected, among received short messages, and short messages newly received in a user's absence;
- wherein said control means appends information regarding the counted number to said extracted indicator icon, and controls said display means to display the resulting indicator icon on a desired area of said screen.

3. The wireless communication terminal as set forth in claim 2, further comprising a key input means including a message confirm key for providing a short message service;
- wherein if said message confirm key is selected, said control means extracts information regarding a list of short messages linked to said extracted indicator icon displayed on said screen from said storage means and control said display means to display the extracted list information on said screen.

4. The wireless communication terminal as set forth in claim 3, wherein if said message confirm key is selected and said short messages linked to said extracted indicator icon displayed on said screen are of a plurality of types, said control means controls said display means to display message inbox menus selectable according to the types of the linked short messages on said screen.

5. The wireless communication terminal as set forth in claim 4, wherein if any one of said message inbox menus is selected, said control means controls said display means to display short message list information corresponding to the selected inbox menu on said screen.

6. The wireless communication terminal as set forth in claim 5, wherein said types of said short messages each include at least one of a text message type, a voice message type, and an image message type.

7. The wireless communication terminal as set forth in claim 1, wherein said control means stores said short message received by said communication means in said storage means, and links said extracted indicator icon displayed on said screen to an address of said storage means at which said short message received by said communication means is stored.

8. A method for displaying an indicator icon using a wireless communication terminal that provides indications as to whether dissimilar serviceable short messages have been received, utilizing the indicator icon that includes at least one or more types of the received short message, comprising the steps of:
- a) storing said indicator icon, said icon corresponding respectively to types of said serviceable short messages such that they are identifiable according to the types of said serviceable short messages;
- b) receiving a short message transmitted from an external device;
- c) determining a type of the received short message utilizing the stored indicator icon; and
- d) displaying a specific one of said stored indicator icon corresponding to the determined short message type on a screen
- wherein the indicator icon includes a character to identify the type of each received short message.

9. The method as set forth in claim 8, further comprising the step of counting a number of short messages whose list information is not selected, among received short messages, and short messages newly received in a user's absence;
- wherein said step d) includes a step of appending information regarding the counted number to said specific indicator icon and displaying the resulting indicator icon on a desired area of said screen.

10. The method as set forth in claim 9, wherein said specific indicator icon displayed on said screen in step d) includes information regarding a link to an address at which said short message received in step b) is stored.

11. The method as set forth in claim 10, further comprising the step of displaying on said screen information regarding a list of short messages linked to said specific indicator icon displayed on said screen, if a menu for confirmation of said stored short message is selected.

12. The method as set forth in claim 11, further comprising the step of displaying message inbox menus selectable according to the types of the linked short messages on said screen if said menu for confirmation of said stored short message is selected and said short messages linked to said specific indicator icon displayed on said screen are of a plurality of types.

13. The method as set forth in claim 12, further comprising the step of displaying short message list information corresponding to the selected inbox menu on said screen, if any one of said message inbox menus displayed on said screen is selected.

14. The method as set forth in claim 13, wherein said types of said short messages each include at least one of a text message type, a voice message type, and an image message type.

* * * * *